(12) United States Patent
Solomon et al.

(10) Patent No.: US 7,216,194 B2
(45) Date of Patent: *May 8, 2007

(54) METHODS AND SYSTEMS FOR IMPROVING DELAYED READ HANDLING

(75) Inventors: Richard L. Solomon, Colorado Springs, CO (US); Jill A. Thomas, Monument, CO (US)

(73) Assignee: LSI Logic Corporation, Milpitas, CA (US)

( * ) Notice: Subject to any disclaimer, the term of this patent is extended or adjusted under 35 U.S.C. 154(b) by 543 days.

This patent is subject to a terminal disclaimer.

(21) Appl. No.: 10/409,569

(22) Filed: Apr. 8, 2003

(65) Prior Publication Data

US 2004/0205282 A1 Oct. 14, 2004

(51) Int. Cl.
G06F 13/36 (2006.01)
(52) U.S. Cl. .................................................... 710/310
(58) Field of Classification Search ............... None
See application file for complete search history.

(56) References Cited

U.S. PATENT DOCUMENTS

| | | | | |
|---|---|---|---|---|
| 5,870,567 A | | 2/1999 | Hausauer et al. | 395/281 |
| 6,134,617 A | | 10/2000 | Weber | 710/105 |
| 6,247,086 B1 | * | 6/2001 | Allingham | 710/314 |
| 6,385,686 B1 | * | 5/2002 | Brown | 710/313 |
| 6,446,248 B1 | | 9/2002 | Solomon et al. | 716/17 |
| 6,483,354 B1 | | 11/2002 | Gasparik | 327/112 |
| 6,549,964 B1 | * | 4/2003 | Lai et al. | 710/107 |
| 6,742,074 B2 | * | 5/2004 | Jeddeloh | 710/309 |
| 6,941,427 B2 | * | 9/2005 | Solomon et al. | 711/156 |
| 6,968,409 B1 | * | 11/2005 | Solomon et al. | 710/112 |
| 2003/0041190 A1 | * | 2/2003 | Kolli | 710/38 |

* cited by examiner

*Primary Examiner*—Rehana Perveen
*Assistant Examiner*—Nimesh Patel
(74) *Attorney, Agent, or Firm*—Ortiz & Lopez, PLLC

(57) ABSTRACT

Methods and systems for improving delayed read handling in a loop of delayed commands among a larger set of commands in a queue of commands are disclosed. In general, when commands in a delayed loop are completed out of order, "holes" are left in the command queue. Skipping over such "holes" consumes multiple clock cycles before another command can be issued, as each "hole" must be examined first in order to determine that it no longer contains a valid read command. A loop of delayed read commands can thus be created from among a larger set of commands in a queue of commands with each command entry having a pointer to the next valid command. Valid delayed read commands in the loop of commands can then be processed by automatically advancing between any two valid delayed read commands among the loop of commands. In this manner, the time to advance between any two commands in the delayed read loop is constant and PCI read performance thereof can be dramatically improved.

20 Claims, 8 Drawing Sheets

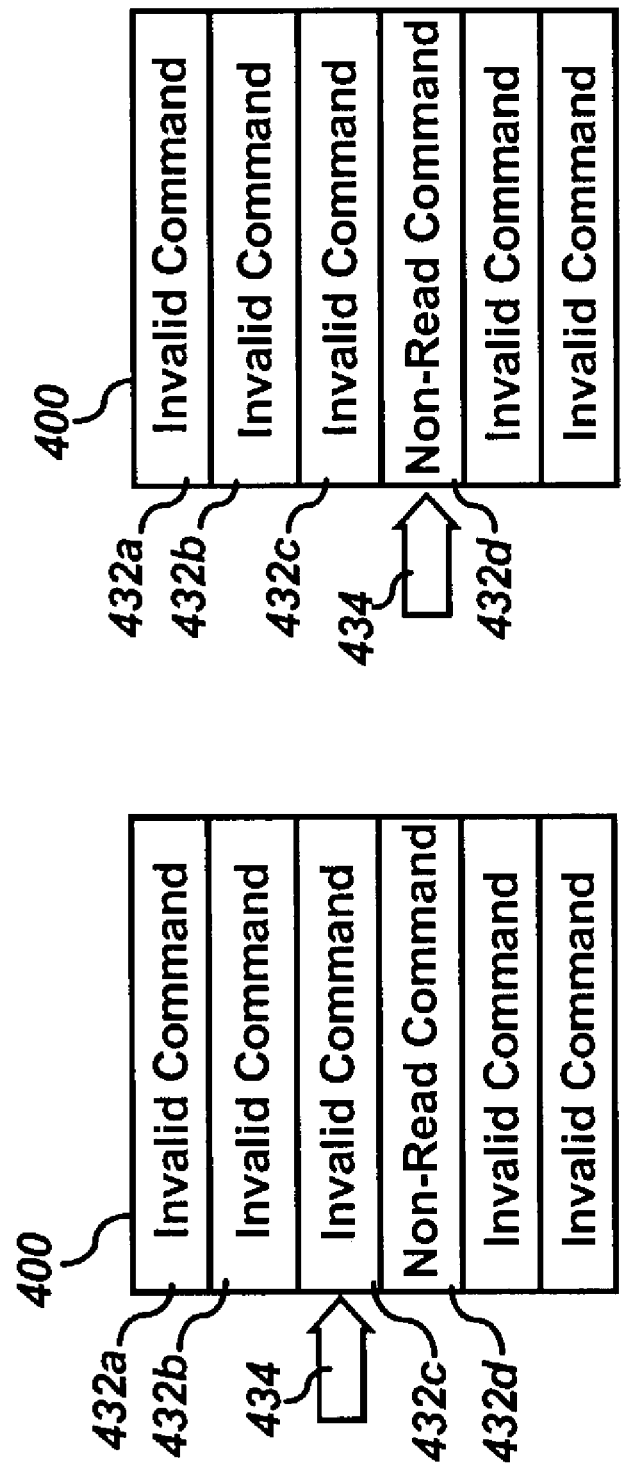

METHODS AND SYSTEMS FOR IMPROVING DELAYED READ HANDLING

TECHNICAL FIELD

The present invention is generally related to data processing methods and systems. The present invention is also related to input/output (I/O) data transfer methods and systems. More particularly, the present invention is related to methods and systems for improving handling of delayed read commands involved in I/O data transfer.

BACKGROUND OF THE INVENTION

Many high-performance I/O interface devices possess buffers in which to establish a queue of read and write commands. Utilizing the buffer to establish the queue of I/O commands permits one or more computer system processors to which the I/O device is attached to continue other computational functions, while read and write I/O commands are processed separately. The I/O commands may be processed by a state machine or by a separate processor, which is functionally part of the I/O interface device. As a result, the main computational processing functions are not delayed while awaiting the completion of the I/O commands, and the processing functionality of the computer system is attached.

One typical use of a queue command buffer is in a bus interface device, such as a conventional PCI bus interface device, one example of which is described in the PCI 2.2 protocol specification. A PCI bus system typically interconnects a large number of electronic devices. The system must maintain, manage and communicate bi-directional data from one device to another device or several devices at once. A typical PCI bus system permits a plurality of PCI-compliant expansion cards and other PCI-based components to be installed in the computer. A PCI bus system requires the utilization of a PCI controller to provide synchronization and control over all of the system components. The PCI controller generally exchanges data with a system CPU and allows intelligent PCI compliant adapters and devices to perform tasks concurrently with the CPU.

The queue command buffer utilized in a PCI bus is typically a first-in first-out (FIFO) buffer, which contains the read and write I/O commands that are to be completed. FIFO generally relates to a method of processing a queue or buffer, in which items are removed in the same order in which they were added. Such an order, for example, is typical of a list of documents waiting to be printed. The commands in the buffer are completed in a FIFO fashion, assuring that each command will ultimately be completed. New I/O commands are written into the top of the queue of the FIFO command buffer, and when a previous command has been fully completed, the command can be unloaded from the bottom of the queue of the FIFO buffer.

Upon attempting to complete a read command from the command buffer and failing to receive data in response to that read command, a queue pointer remains at the position of the read command, which has incurred a response. A failure to unload the delayed read command from the queue of the FIFO buffer can cause the delayed read command to be retried until a response is received. This type of continued attempted completion of the delayed read command is known as a spin on single retried request. A spin on single retried request permits issuing only one read command until that read command has been completed. A spin on single retried request can be achieved by maintaining the position of the queue pointer at the delayed read command until that read command is completed, at which time the then-completed read command is unloaded from the queue of the FIFO buffer.

Another type of technique for handling delayed read commands in the queue of the FIFO buffer is known as head-of-list alternation. Head-of-list alternation involves an added capability to alternate or swap another read command within the FIFO buffer in place of the delayed read command at the head of the list in the queue. Thus, upon encountering a first delayed read command, and if the next command in the FIFO buffer is also a read command, the relative position of the first delayed command and the next read command can be alternated, so that an attempt is made to complete the next read command while the first read command is delayed. After the swap or alternation, completion of the second command is attempted.

If the second command is successfully completed, it is unloaded from the queue and completion of the first delayed read command can again be attempted. If the first read command is again delayed, the head-of-list alternation will again seek to substitute another read command following the first delayed read command, if another such read command is available in the queue. If, however, the next command in the FIFO buffer is not a read command, the first delayed read command is again retried until it is completed. This head-of-list alternation therefore functions only if two read commands are available in sequential positions in the queue of the FIFO buffer. If a command other than a read command follows a delayed read command, head-of-list alternation is not possible.

Head-of-list alternation between delayed read commands is more efficient than a spin on single retired request of the first delayed read command, because alternating between two read commands offers the opportunity to enqueue two read commands to target devices (e.g., memories or disk drives) for response. Head-of-list alternation also offers the possibility of receiving a response from one of the two enqueued commands during the waiting time that would normally be encountered while waiting for a response to only a single enqueued read command. The latency in response of a target device to a read command is spread over two target devices, and the latency is thereby diminished in relation to the number of read commands that are completed. As a consequence, the data throughput can be enhanced compared to the data throughput achieved when a single delayed read command must be retried continually before any other commands in the queue command can be completed.

Head-of-list alternation works for two sequential read commands in the FIFO buffer because there are never any gaps between read commands. If a gap between read commands exists, head-of-list alternation is not performed and instead, spin on single retried request is performed until the delayed read command is completed. Head-of-list alternation is accomplished only because of the ability to swap the two sequential read commands until one of them is completed at the top of the list and is unloaded from the FIFO buffer.

Although the PCI 2.2 protocol specification theoretically supports the concept of extending the number of delayed read commands beyond two, no specific technique has been described for doing so. Substantial complexities can be encountered when attempting to expand the number of delayed read commands beyond two, particularly in regard to handling those delayed read commands that may have been completed between the first and the last ones of a greater number of delayed read commands. The PCI 2.2 protocol specification does not specifically address a capability for adjusting the depth or content of the number of delayed read commands between the first and last delayed read commands.

Consequently, head-of-list alternation offers the possibility of completing two sequential delayed read commands, but does not extend in a straightforward manner to the possibility of attempting completion of three or more delayed read commands. In some computer systems, head-of-list alternation offers only slightly increased performance (i.e., reduced latency) compared to spin on single retried request performance because of the extent of the delays encountered in response to read commands in complex modern computer systems.

Another type of technique for handling delayed read commands in the queue of the FIFO buffer involves creating a "loop" of commands beginning with the first delayed reads and ending with the last and cycling through those reads until all are completed. When commands, however, in such a delayed read loop are completed out of order, "holes" can be left in the command queue. Skipping over such "holes" can consume multiple clock cycles before another command is issued. The present inventors thus believe that a need exists for improved methods and systems for handling delayed read commands. It is believed that such methods and systems, if implemented appropriately, can provide enhanced PCI performance.

BRIEF SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings and abstract as a whole.

It is therefore one aspect of the present invention to provide improved data processing methods and systems.

It is another aspect of the present invention to provide improved input/output (I/O) data transfer methods and systems.

It is a further aspect of the present invention to provide methods and systems for improving delayed read command handling involved in I/O data transfer.

It is an additional aspect of the present invention to enhance data processing associated with peripheral component interconnect (PCI) bus devices, including, but not limited to, PCI bus interface controllers and PCI memory targets.

The above and other aspects of the invention can be achieved as will now be briefly described. Methods and systems for improving delayed read handling in a loop of delayed commands among a larger set of commands in a queue of commands are described herein. In general, when commands in a delayed loop are completed out of order, "holes" are left in the command queue. Skipping over such "holes" consumes multiple clocks before another command can be issued, as each "hole" must be examined first in order to determine that it no longer contains a valid read command.

A loop of delayed read commands can thus be created from among a larger set of commands in a queue of commands with each command entry having a pointer to the next valid command. Valid delayed read commands in the loop of commands can then be processed by automatically advancing between any two valid delayed read commands among the loop of commands. In this manner, the time to advance between any two commands in the delayed read loop is constant and PCI read performance thereof can be dramatically improved.

BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

DETAILED DESCRIPTION OF THE INVENTION

The particular values and configurations discussed in these non-limiting examples can be varied and are cited merely to illustrate an embodiment of the present invention and are not intended to limit the scope of the invention.

Figure 1:
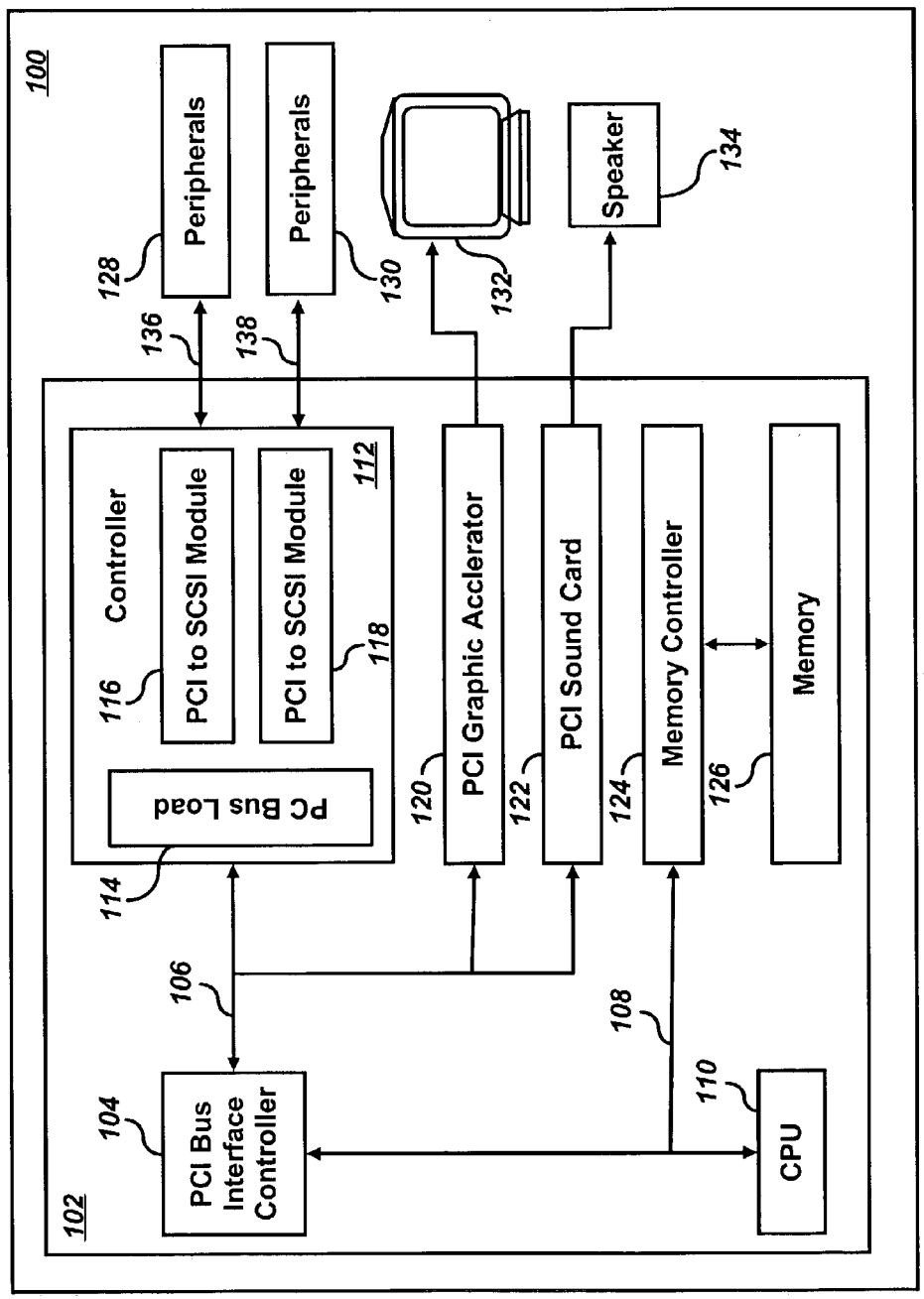
FIG. 1 illustrates a block diagram of a PCI computer system, in which the present invention can be implemented.

FIG. 1 illustrates a block diagram of a PCI computer system 100, in which the present invention can be implemented. It can be appreciated by those skilled in the art that system 100 merely represents one possible configuration in which the present invention may be embodied and that many variations in light of the teachings herein can also be implemented in the context of alternative embodiments thereof. Thus, PCI computer system 100 generally includes a PCI computer system architecture 102 which interacts with a peripherals 128 and 130, a monitor 132, and at least one speaker 134. A peripheral, such as peripheral 128 and/or peripheral 130, can be implemented as a component, such as a fixed disk, an optical disk, a printer, tape drive, or other such peripheral devices.

Computer system architecture 102 generally includes a PCI bus interface controller 104, which can communicate with a multifunction controller 112, a PCI graphic accelerator 120, and a PCI sound card 122 utilizing a PCI bus 106. Multifunction controller 112 generally includes a PCI bus interface 114, a PCI-to-SCSI module 116, and a PCI-to-SCSI module 118. Communication between multifunction controller 116 and peripherals 128 and 130 can respectively take place utilizing an SCSI bus 136 and an SCSI bus 138, which can each respectively communicate directly with PCI-to-SCSI module 116 and PCI-to-SCSI module 118. PCI bus interface controller 104 can also communicate with a central processing unit (CPU) 110 and a memory controller 124 via a processor bus 108. Memory controller 126 in turn can communicate with a memory 126.

Figure 2:
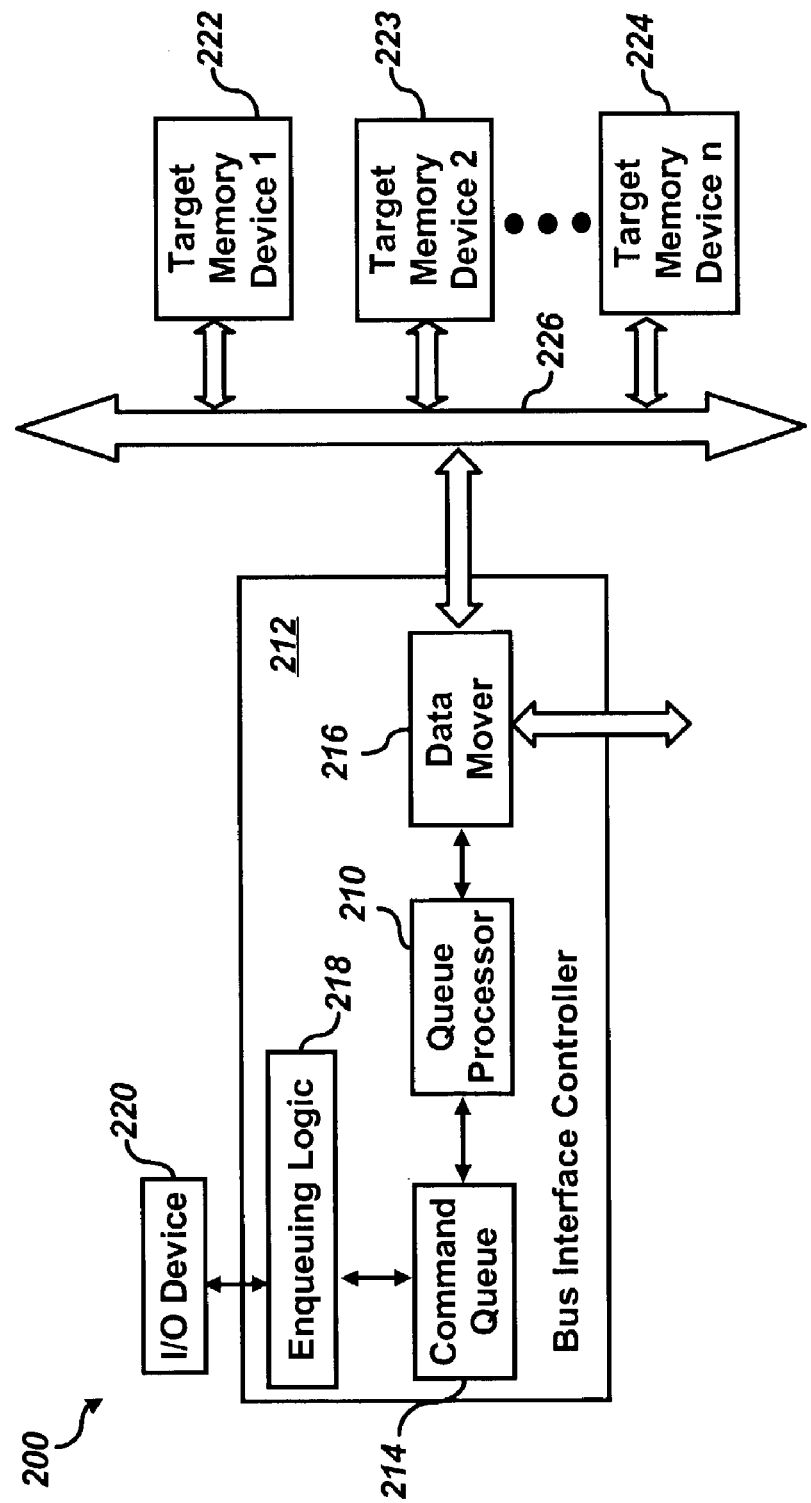
FIG. 2 illustrates a block diagram of a PCI-based system that includes a bus interface controller and a portion of a bus that can communicate with multiple target devices thereof, in accordance with one potential embodiment of the present invention.

FIG. 2 illustrates a block diagram of a PCI-based system 200 that includes a bus interface controller 212 and a portion of a bus 226 that can communicate with multiple target devices thereof, in accordance with one potential embodiment of the present invention. Bus interface controller 212 is generally analogous to PCI bus interface controller 114 of FIG. 1. Bus interface controller 212 of FIG. 2 can thus be implemented as PCI bus interface controller 114 of FIG. 1 for data transfer and processing operations thereof. Bus interface controller 212 generally includes a queue processor 210, a conventional command queue 214, a conventional data mover 216, and conventional command enqueuing logic 218.

According to one possible embodiment of the present invention, the method and system disclosed herein can be advantageously implemented in the context of queue processor 210. The queue processor 210 forms a part of bus interface controller 212 and is generally connected to both the command queue 214, and the data mover 216 for interaction with both in the manner described below. The enqueuing logic 218 can be connected to the command queue 214, and generally functions to place or put commands received from a conventional I/O device 220 into the command queue 214. Other than the queue processor 210, the bus interface controller 212 can form part of the otherwise-conventional I/O device 220.

The I/O device 220, including the bus interface controller 212 and the data mover 216, are generally connected to one or more target devices 222, 223, and 224, through a conventional bus 226. Typical target devices are or can include devices, such as memories, disk drive storage devices, bridges, or other devices to and through which I/O commands may be routed and completed. Note that peripherals 128 and 130 of FIG. 1 may constitute such target devices.

In general, data can be written and/or read, and commands are otherwise transferred between the I/O device 220 and the target devices 222, 223 and 224 by signals communicated to and from the bus interface controller 212 over the bus 226. Each target device 222, 223, and 224 also can include a bus interface (not shown in FIG. 2) which can communicate signals from the bus between the components of the target devices 222, 223 or 224 and the bus 226. The bus interface controller 212, the bus 226, and the bus interfaces which are part of the target devices can be, for example, a part of a PCI bus, which is otherwise conventional except for the queue processor 210 and its associated functionality in which the present invention can be embodied. Note that an example of a PCI bus of this type is depicted in FIG. 1 herein as PCI bus 106.

Queue processor 210 generally improves the transfer of data read from target devices 222, 223 and/or 224, and also generally improves the completion of commands communicated between the I/O device 220 and the target devices 222, 223 and/or 224. The data read from the target devices 222, 223, and 224 can be supplied over bus 26 and delivered to the I/O device 220. The I/O device 220 generally delivers data to a processor (e.g., CPU 110 of FIG. 1) and other components of a computer system (e.g., computer system 100 of FIG. 1) to which the I/O device 220 can be connected. The queue processor 210 generally transfers more read commands to the data mover 216 for completion by the target devices 222, 223 and 224 in a given or reduced amount of time to thereby obtain enhanced overall I/O performance.

Figures 3A, 3B:
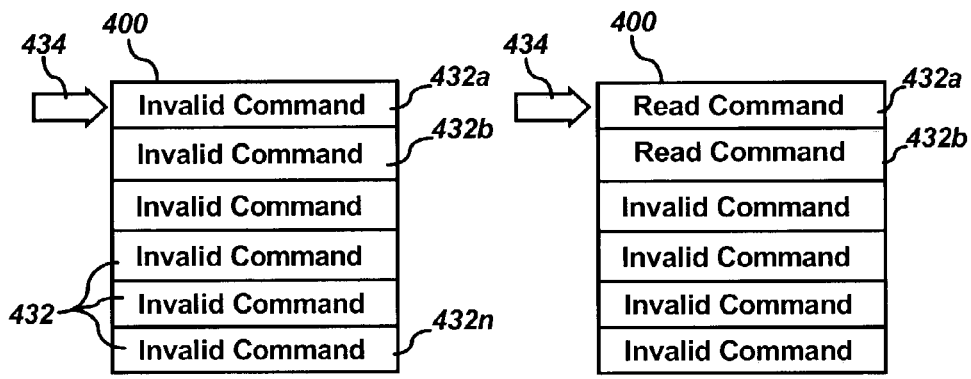
FIGS. 3A to 3R illustrate block diagrams depicting commands in a circular queue command buffer of a bus interface controller, which can be processed according to a preferred embodiment of the present invention.
Figures 3C, 3D:
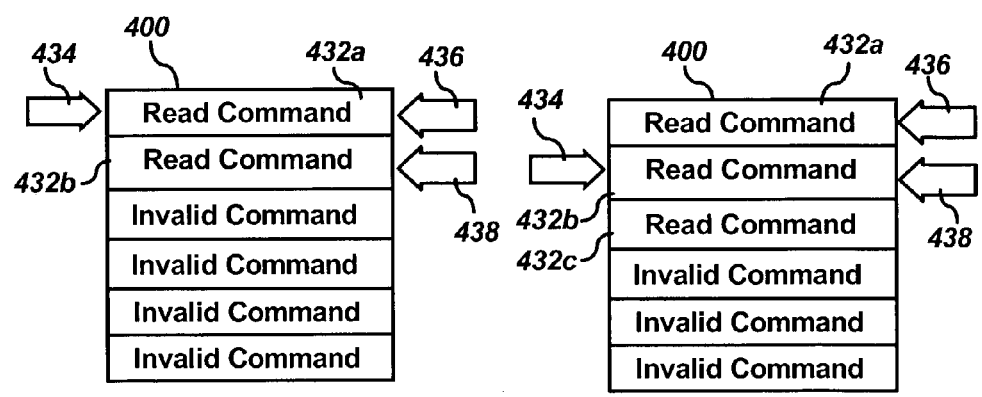
Figure 3E:
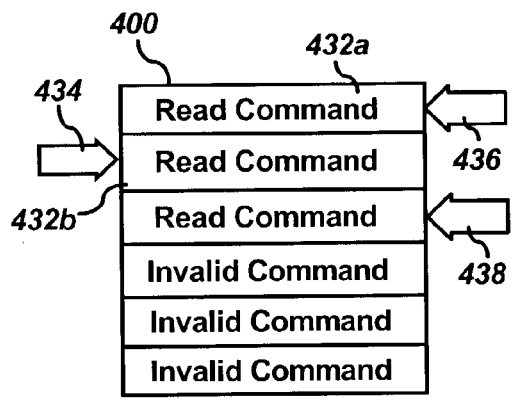
Figure 3F:
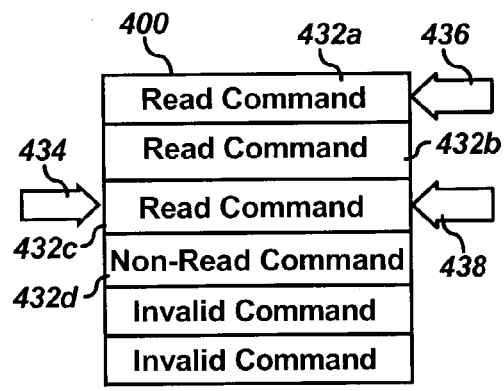
Figure 3G:
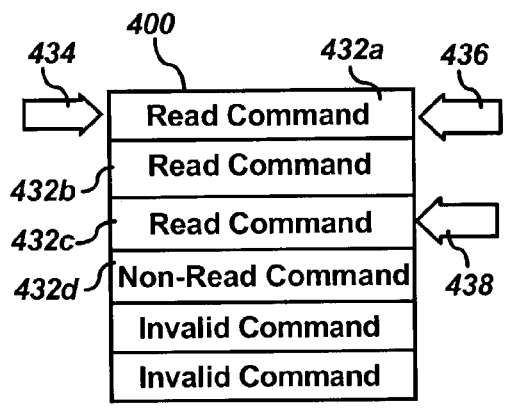
Figure 3H:
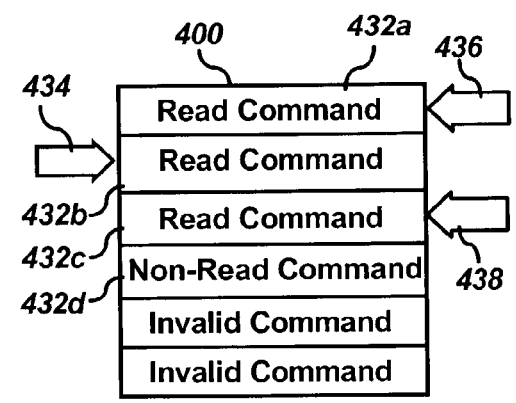
Figures 3I, 3J:
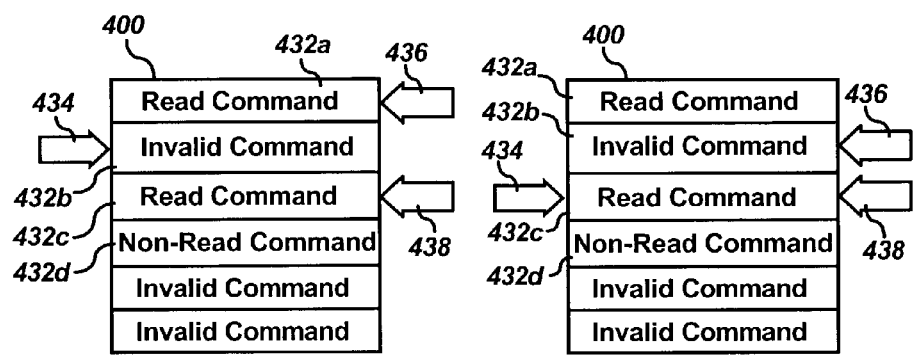
Figures 3K, 3L:
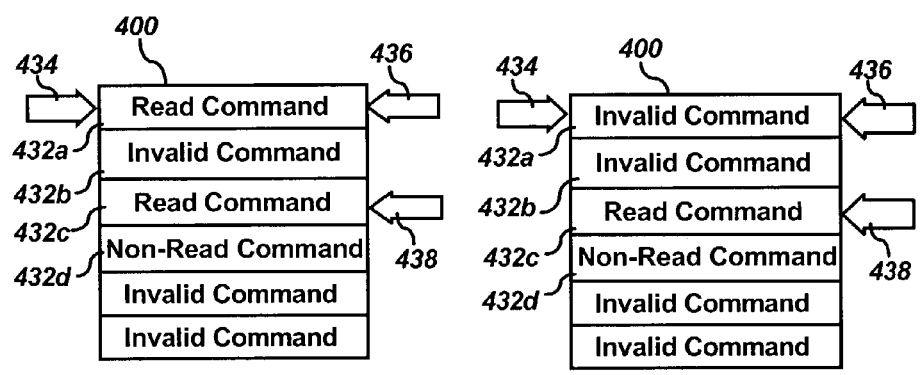
Figure 3M:
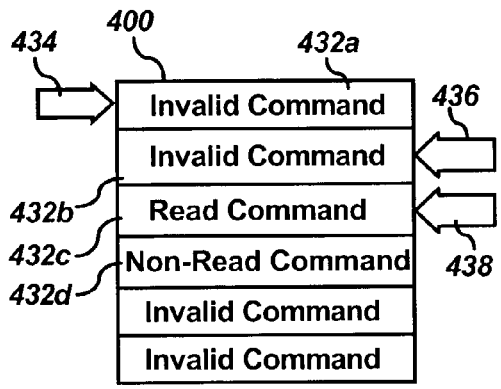
Figure 3N:
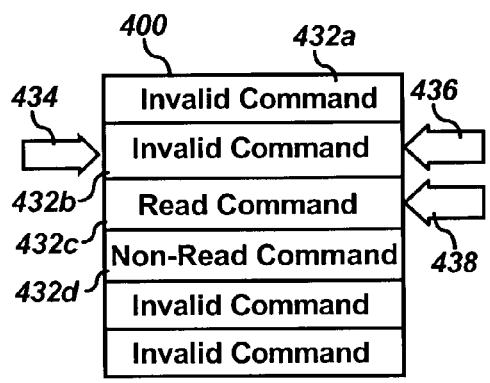
Figure 3O:
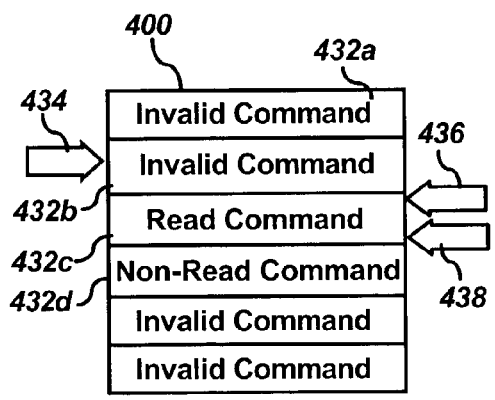
Figure 3P:
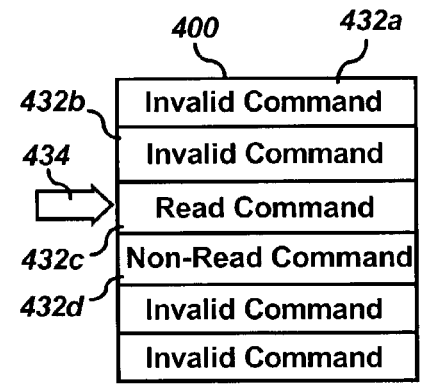

FIGS. 3A to 3R are block diagrams illustrating commands in a circular queue command buffer of a bus interface controller, which can be processed according to a preferred embodiment of the present invention. The command queue 214, which is generally described herein with respect to FIG. 2, can establish a circular queue command buffer 400 of the form generally depicted in FIGS. 3A to 3R. Conventional I/O commands 432 can be contained within the queue command buffer 400, and the commands 432 can be completed in a circular manner in the sense that commands 432 contained within buffer 400 are logically completed in a loop so that a first command 432a is typically completed immediately after a last command 432n. Moreover, as a general consequence of the circular and logical loop, the commands can also be typically completed in a first-in first-out (FIFO) sequence. As will be explained in further detail herein, however, delayed read commands in a loop may not be strictly completed in a FIFO sequence, although their completion can occur in a more efficient manner that if a strict FIFO sequence is observed.

The commands in buffer 400 shown in FIGS. 3A to 3R are generically referred to by the reference number 432, and individual commands are specifically identified according to the specific reference numerals 432a, 432b, 432c, 432d, etc. to 432n. The commands 432 in the buffer 400 are typically read and write commands. A conventional read command causes the bus interface controller, such as for example, bus interface controller 212 of FIG. 2 or PCI bus interface controller 104 of FIG. 1., to send a read request to target devices, such as target devices 222, 223 or 224 of FIG. 2, which can result in the retrieval of the data from such target devices at the address identified in the read command and transmission of that data back to the 1/O device 220 of FIG. 2.

A conventional write command generally involves sending a write command to a target device 222, 223 or 224 along with the data to be written, and the target device 222, 223 or 224 can respond by writing the data at the address specified in the write command 432. A command may specify that a very large amount of data be moved. Because of protocol specification applicable to the sizes of the transactions, the amount of available buffer space, and the like, a single command can be splintered into multiples parts. The data for all of the data parts of a single transaction need not be moved at one time, but until all of the data parts of the transaction have been moved, the command will not have been completed.

If a read command cannot be immediately completed, because of other activity occurring at the target device 222, 223 or 224, the read command becomes a delayed transaction. A delayed transaction is a command that must be completed on the target device before continuing operation via the master originating I/O device. A delayed transaction progresses to completion in three steps: first, a request by the master; second, completion of the request by the target; and third, completion of the transaction by the master. During the first step, the master generates a transaction, and the target decodes the access and latches the information required to complete the access. Thereafter, the target terminates the request by an indication to the master to retry. In order to finalize the transaction, the master must eventually reissue the request until the request is completed.

During the second step, the target independently completes the request utilizing the latched information. If the delayed transaction is a read request, the target obtains the requested data. The target stores information indicating that is has completed its part of the transaction. During the third step, the master reissues the original request. The target, having previously completed the delayed transaction, sends the master a signal indicating that the transaction has been completed. The status information returned to the master is exactly the same as the information obtained by the target when it completed the delayed read request.

The command 432 can be identified by a conventional get queue pointer 434, which forms part of the command buffer 400. The typical position of the get queue pointer 34 relative to the commands 432 in the buffer 400 can be established by the conventional functionality of a bus interface controller, such as, for example bus interface controller 212 of FIG. 2 or PCI bus interface controller 104 of FIG. 1. The conventional functionality of bus interface controller 212 or PCI bus interface controller 104 can be defined by the PCI 2.2 protocol specification, as one possible example.

The queue processor 210, which is illustrated in FIG. 2, can modify and control the normal positioning of the get queue pointer 434 by establishing a non-conventional and additional loop start pointer 436 and a non-conventional and additional loop end pointer 438, as shown and described herein with respect to FIGS. 3C to 3O. The queue processor generally defines a dynamically adjustable loop of delayed read commands, which can be completed before other commands of the command buffer 400 are completed. In this manner, more read commands are expected and less time is consumed by the latency of the responses from the target devices.

The commands 432 are generally placed in the buffer 400 by conventional enqueing logic, such as enqueing logic 218 depicted in FIG. 2. Enqueing logic 218 can include a put pointer (not shown), which can point to a location in buffer 400 of an invalid command. An invalid command is one that has been previously completed. An invalid command, having been completed, can be replaced by a new, valid command for which subsequent completion is desired by an I/O device, such as I/O device 220. The put pointer of the enqueuing logic 18 operates independently of the get pointer 432, the loop start pointer 436 and the loop end pointer 438 (e.g., see FIGS. 3A to 3R). The put pointer is generally deployed in advance of the location of the get pointer 432 in order to enable buffer 400 to be loaded with commands that are subsequently completed.

When there are no valid commands in the buffer 400, however, the get and the end pointers will be at the same location, with the put pointer identifying the location where the enqueuing logic will insert the next valid command and with the get pointer identifying the same location where the queue processor 210 begins to process the next valid command entered at that location. The enqueing logic manages the location of the put pointer in a conventional manner. Consequently, the activity of the put pointer and the enqueuing logic can operate as part of an embodiment of the present invention, although the invention described herein can be embodied with conventional functionalities.

Based on the foregoing discussion, it can be appreciated that a core can create a loop of delayed reads or read actions and then advance through such read functions. Utilizing a queue traversal optimization process, retired commands can be skipped with no additional time impact. In general, a queue of commands may include entries for completed commands, interrupted commands, null commands, yet-to-be completed commands, and the like. Non-completed commands can be assigned a tag (e.g., a validity tag) indicating that these commands are valid for reissue.

Completed commands, null commands, commands that have been discarded by the controller, and the like are assigned a tag indicating these commands are invalid for reissue. A next valid address pointer may be utilized to collect the valid command queue positions in a list of adjacent entries to provide a more rapid access to the commands to reissue. All next valid address pointers can then be updated in parallel by independent logic without the need for a processor to handle next valid address pointer management. Direct interaction may no longer be required between queue processing logic and the next valid address logic. That is, when queue processing logic clears an entry's valid flag, all queue entries are updated.

The core would advance from queue entry to the next, checking the validity flag to determine if the command needed to be re-issued. The core itself can maintain a circular (or linear) buffer (or queue) of commands (e.g., buffer 400) to process. In a worst case scenario, the delayed read loop would occupy the entire command queue with only the first and last of N queue entries still valid, so that the delayed read logic would have to traverse N-2 invalid queue entries in order to re-issue the 2 commands. The invention described herein, however, represents an improvement over such conventional looping methods. In accordance with one possible embodiment of the present invention, as will be discussed shortly, the time to advance between any two commands in a delayed read loop is constant and PCI read performance can be dramatically improved.

Figure 4:
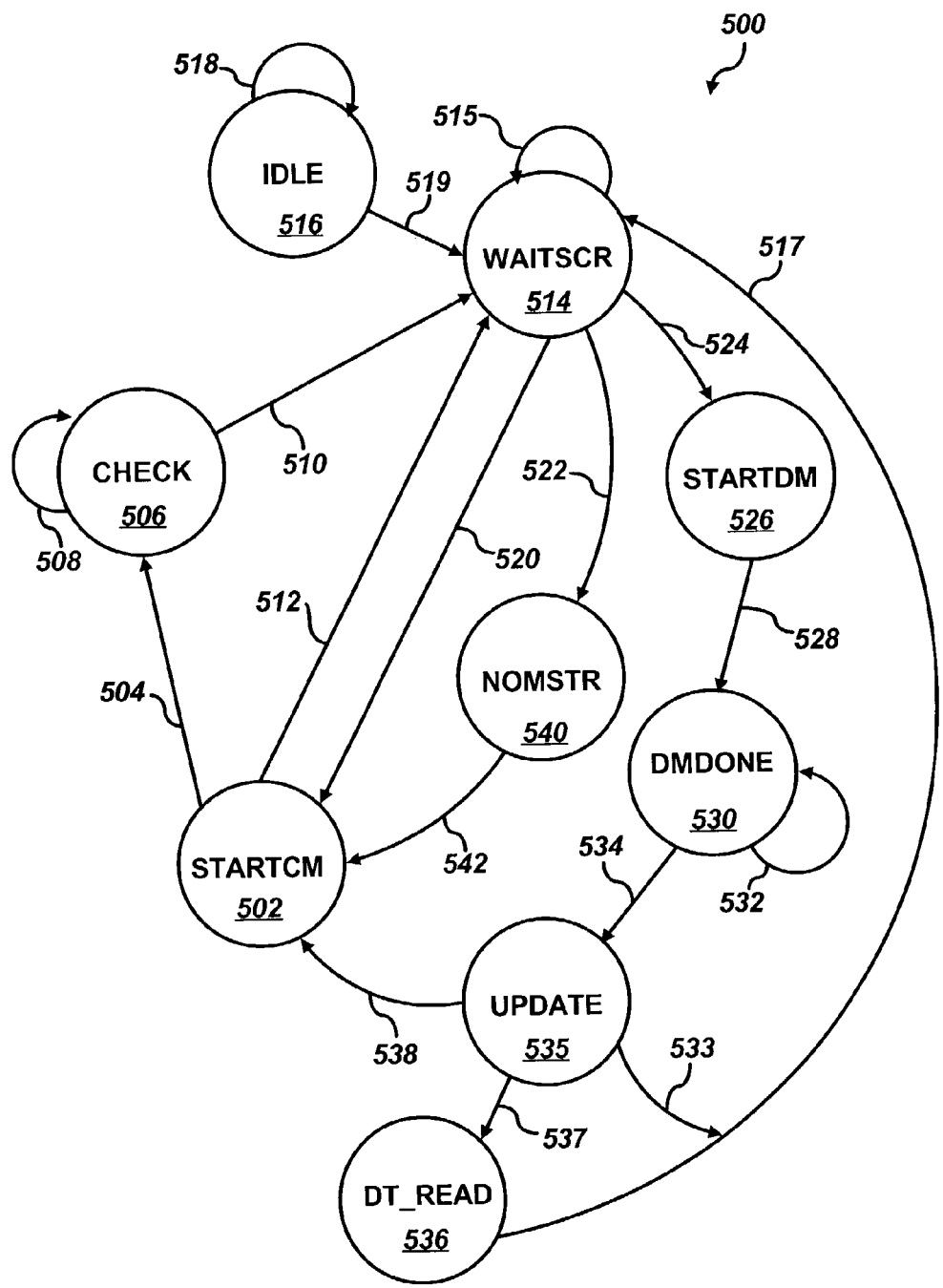
FIG. 4 illustrates a state machine generally illustrative of a method for improved delayed read handling, in accordance with a preferred embodiment of the present invention.

FIG. 4 illustrates a state machine 500 generally illustrative of a method for improved delayed read handling, in accordance with a preferred embodiment of the present invention. As indicated at node 502, the process is initiated. The operation depicted at node 502 (i.e., STARTCM) generally comprises a start mode. A buffer such as buffer 400 (i.e., a queue) described herein receives one or more commands. As depicted at node 506, a test is performed to determine if an entry in the buffer 400 is valid. Arrow 504 located between node 502 and node 506 indicates that a complete decoupling of the flow process and a resetting of fault values to a zero count. As indicated by arrow 508, a loop is generally performed involving arrow 508 and node 506 in which a determination is made whether or not the entry is valid. When an entry has been determined as valid as indicated by arrow 510, a wait state is processed as depicted at node 514.

Whenever state machine 500 illustrated in FIG. 4 is in a STARTCM or DT_READ mode, the "get" pointer 434 described and depicted herein with respect to FIGS. 3A to 3R is updated with the "NextValidAddr" (i.e., next valid address) field of the command to which it is pointing. A similar update occurs when state machine 500 is in a CHECK state and an external indication 'CqEntryValid" is false, which indicates that the currently pointed to command is not valid. This handles the case in which the last command in the queue completes, because the "put" pointer may fill another slot. The "get" pointer must update continuously to "catch" when a new command is added elsewhere.

Thus, it can be appreciated by those skilled in the art that these type of updates can be utilized to replace conventional logic in which the "get" pointer 434 increments in similar places. With conventional methods, several state transitions are needed to return to the state in which the "get" pointer increments, which results in a loss of time handling "holes". With the new method and system described herein, with respect to particular embodiments of the present invention, the state machine 500 can move immediately to the next valid command rather than mindlessly proceeding through the loop in order.

A determination can be made, as indicated by arrow 514, whether or not an entry is available in the queue and memory thereof can be written. An idle state is indicated by node 516, along with arrow 518. Following processing of the wait state depicted at node 514, several processing paths are possible, as indicated by arrows 522 and 524. Arrow 522 indicates that the master has been disabled. Note that the operation depicted at node 540 is labeled "NOMSTR," which refers to a state that handles the case in which the current PCI master function has been disabled. In this condition, commands are immediately retired with an error condition, as the core is prohibited from issuing them on the bus.

Following processing of the operation depicted at node 540, the loop returns to node 502 and the process can be repeated, if necessary. Arrow 524, which is processed after the wait operation depicted at node 514, indicates that an entry is available and that data can be written to an appropriate memory location thereof. Following processing of the operation associated with arrow 524, a "STARTDM" operation is processed, as indicated at node 526, followed by a test operation, as depicted at block 530 and 532 in which the DM is finished.

Note that the acronym "DM" generally refers to the phrase "data mover". An example of a DM or data mover is data mover 216 of FIG. 2. The acronym "CM," on the other hand, refers to a component of bus interface controller 212 of FIG. 2, which returns completion status to I/O device 220 of FIG. 2. STARTDM, illustrated at node 526, is the state, which kicks off the actual data movement on the PCI. STARTCM, depicted at node 502, is the state, which kicks off the indication to 220 that a command it put into 218 has completed.

The operation depicted at node 530 occurs after the operation associated with arrow 528 is processed. When the DM (data mover) operation is completed, following both the operation described at node 530 (i.e., DMDONE) and arrow 534, an update operation is processed, as indicated at node 535 (i.e., UPDATE). Several possible processing paths can be taken following the operation illustrated at node 535, including a delayed transaction as indicated by arrow 538, a delayed transaction and a transaction loop enable operation, as indicated by arrow 537, and a fault and length operation as indicated by arrow 533. A read operation occurs following processing of the operation associated with arrow 537.

Following processing of the operation associated with arrow 538 (i.e., a delayed transaction operation), the function associated with node 502 (i.e., STARTCM) is processed and the entire methodology associated with state machine 500 can then repeat itself. Following processing of the read operation associated with node 536 (i.e., DT_READ), a next command read operation, together with a looping and flags, can be occur, which is represented by arrow 517. Note that node 536 generally refers to a read mode.

It can be appreciated by those skilled in the art that state machine 500 depicted in FIG. 5 can be implemented in the context of modules (i.e., software modules). Thus, state machine 500 can be divided into one or more module categories. Each node depicted in FIG. 4 can be implemented as such a module. State machine 500 can thus be implemented in the context of a program product (i.e., computer program product), which is composed of one or more modules. The term "module" as utilized herein thus generally refers to a software module. In the computer programming arts, a module can be implemented as a collection of routines and data structures that performs particular tasks or implements a particular abstract data type.

Modules generally are composed of two parts. First, a software module may list the constants, data types, variable, routines, and so forth that can be accessed by other modules or routines. Second, a software module may be configured as an implementation, which can be private (i.e., accessible only to the module), and which contains the source code that actually implements the routines or subroutines upon which the module is based. Thus, when referring to a "module" herein, the present inventors are referring so such software modules or implementations thereof. It can therefore be appreciated by those skilled in the art the methodology illustrated and described herein can be implemented as a series or group of such modules. Such modules can be utilized separately or together to form a program product that can be implemented through signal-bearing media, including transmission media and/or recordable media.

The embodiments and examples set forth herein are presented to best explain the present invention and its practical application and to thereby enable those skilled in the art to make and utilize the invention. Those skilled in the art, however, should recognize that the foregoing description and examples have been presented for the purpose of illustration and example only. Other variations and modifications of the present invention will be apparent to those skilled in the art after reading the detailed description. Such variations and modifications are covered by the appended claims disclosed herein. The description as set forth is not intended to be exhaustive or to limit the scope of the invention. Many modifications and variations are possible in light of the above teaching without departing from the spirit and scope of the following claims. It is contemplated that the use of the present invention can involve components having different characteristics. It is intended that the scope of the present invention be defined by the claims appended hereto, giving full cognizance to equivalents in all respects.

The embodiments of the invention in which an exclusive property or right is claimed are defined as follows. Having thus described the invention what is claimed is:

1. A method for improving delayed read handling in a loop of delayed commands among a larger set of commands in a queue of commands, said method comprising the steps of:

creating a loop of delayed read commands from among a larger set of commands in a queue of commands; and searching valid delayed read commands in said queue of commands by automatically advancing between any two valid delayed read commands among said queue of commands at a constant rate for processing thereof, thereby resulting in an improved handling of delayed read commands involved in an I/O data transfer.

2. The method of claim 1 further comprising the step of: processing only valid delayed react commands traversed through said queue of commands.

3. The method of claim 1 further comprising the step of: determining if a delayed read command among said queue of commands comprises a valid command.

4. The method of claim 1 wherein the step of creating a loop of delayed read commands from among a larger set of commands in a queue of commands, further comprises the step of:

creating said loop of delayed read commands from among said larger set of commands in said queue of commands for utilization in association with an interface controller.

5. The method of claim 1 wherein the step of creating a loop of delayed read commands from among a larger set of commands In a queue of commands, further comprises the step of:

creating said loop of delayed read commands from among said larger set of commands in said queue of commands within a state machine having at least one get pointer thereof.

6. The method of claim 5 further comprising the step of:
updating said at least one get pointer with a next valid address field of a command to which said at least one get pointer points during a start mode of said state machine.

7. The method of claim 5 further comprising the step of:
updating said at least one get pointer with a next valid address field of a command to which said at least one get pointer points during a read mode of said state machine.

8. The method of claim 5 further comprising the step of:
continuously updating said at least one get pointer to determine when a new command is added within a context of said state machine.

9. The method of claim 5 further comprising the step of:
processing a read operation of said state machine; and
thereafter processing a next command read operation in association with a looping and operation.

10. A method for improving delayed read handling in a loop of delayed commands among a larger set of commands in a queue of commands, said method comprising the steps of:
creating a loop of delayed read commands from among a larger set of commands in a queue of commands;
searching valid delayed read commands in said queue of commands by automatically advancing between any two valid delayed read commands among said queue of commands at a constant rate for processing thereof;
determining if a delayed read command among said queue of commands comprises a valid command; and
processing only valid delayed read commands traversed through said queue of commands, thereby resulting in an improved handling of delayed read commands involved in an I/O data transfer.

11. A system for improving delayed read handling in a loop of delayed commands among a larger set of commands in a queue of commands, said system comprising:
a loop of delayed read commands created from among a larger set of commands in a queue of commands; and
wherein valid delayed read commands in said queue of commands are searchable by automatically advancing between any two valid delayed read commands among said queue of commands at a constant rate for processing thereof, thereby resulting in an improved handling of delayed read commands involved in an I/O data transfer.

12. The system of claim 11 wherein only valid delayed read commands traversed through said queue of commands are processed.

13. The system of claim 11 wherein a delayed read command among said queue of commands comprises a valid command.

14. The system of claim 11 wherein said loop of delayed read commands is created from among said larger set of commands in said queue of commands for utilization in association with an interface controller.

15. The system of claim 11 wherein said loop of delayed read commands is created from among said larger set of commands in said queue of commands within a state machine having at least one get pointer thereof.

16. The system of claim 15 wherein said at least one get pointer is updated with a next valid address field of a command to which said at least one get pointer is pointing during a start mode of said state machine.

17. The system of claim 15 wherein said at least one get pointer is updated with a next valid address field of a command to which said at least one get pointer is pointing during a read mode of said state machine.

18. The system of claim 15 wherein said at least one get pointer is continuously to determine when a new command is added within a context of said state machine.

19. A system for improving delayed read handling in a loop of delayed commands among a larger set of commands in a queue of commands, said system comprising:
a loop of delayed read commands created from among a larger set of commands in a queue of commands;
valid delayed read commands in said queue of commands searchable by automatically advancing between any two valid delayed read commands among said queue of commands at a constant rate for processing thereof;
wherein a delayed read command among said queue of commands comprises a valid command; and
wherein only valid delayed read commands traversed through said queue of commands are processed, thereby resulting in an improved handling of delayed read commands involved in an I/O data transfer.

20. The system of claim 19 wherein:
said loop of delayed read commands is created from among said larger set of commands in said queue of commands within a state machine having at least one get pointer thereof; and
wherein said at least one get pointer is updated with a next valid address field of a command to which said at least one get pointer is pointing during a start mode of said state machine.

* * * * *